(12) United States Patent
Oz et al.

(10) Patent No.: US 12,307,630 B2
(45) Date of Patent: May 20, 2025

(54) METHODS AND SYSTEMS FOR SUPER RESOLUTION FOR INFRA-RED IMAGERY

(71) Applicants: The State of Israel, Ministry of Agriculture & Rural Development, Agricultural Research Organization (ARO) (Volcani Institute), Rishon Lezion (IL); RAMOT AT TEL AVIV UNIVERSITY LTD., Tel Aviv (IL)

(72) Inventors: Navot Oz, Rishon Lezion (IL); Iftach Klapp, Rishon Lezion (IL); Nir Sochen, Tel Aviv (IL)

(73) Assignees: THE STATE OF ISRAEL, MINISTRY OF AGRICULTURE & RURAL DEVELOPMENT, AGRICULTURAL RESEARCH ORGANIZATION, Rishon Lezion (IL); RAMOT AT TEL AVIV UNIVERSITY LTD., Tel Aviv (IL)

( * ) Notice: Subject to any disclaimer, the term of this patent is extended or adjusted under 35 U.S.C. 154(b) by 334 days.

(21) Appl. No.: 17/641,861

(22) PCT Filed: Sep. 13, 2020

(86) PCT No.: PCT/IL2020/051004
§ 371 (c)(1),
(2) Date: Mar. 10, 2022

(87) PCT Pub. No.: WO2021/048863
PCT Pub. Date: Mar. 18, 2021

(65) Prior Publication Data
US 2022/0335571 A1 Oct. 20, 2022

Related U.S. Application Data

(60) Provisional application No. 62/898,827, filed on Sep. 11, 2019.

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01)

(58) Field of Classification Search
CPC .................................................. G06T 3/4053
See application file for complete search history.

(56) References Cited

U.S. PATENT DOCUMENTS 10,223,611 B1 * 3/2019 Price ........................ G06F 18/24
2017/0347061 A1 11/2017 Wang et al.
(Continued)

FOREIGN PATENT DOCUMENTS

CN 108259997 A 7/2018
WO 2019153671 A1 8/2019

OTHER PUBLICATIONS

He Zewei et al: "Cascaded Deep Networks With Multiple Receptive Fields for Infrared Image Super-Resolution", IEEE Transactions on Circuits and Systems for Video Technology, IEEE, USA, vol. 29, No. 8, Aug. 1, 2019 (Aug. 1, 2019), pp. 2310-2322, XP011738148, ISSN: 1051-8215, DOI: 10.1109/TCSVT. 2018.2864777.
(Continued)

*Primary Examiner* — Di Xiao
(74) *Attorney, Agent, or Firm* — Rivka Friedman

(57) ABSTRACT

An artificial neural network for processing low-resolution images to generate super-resolution images includes feed-forward connections between layers. The network includes an input layer, one or more convolution layers, wherein the input layer is connected to a first convolution layer of the convolution layers, and a output layer connected to a last convolution layer of the convolution layers. An input image is input to the input layer and to at least one of the
(Continued)

convolution layers, an initial output of the input layer is input to at least one of the convolution layers, and a layer output of at least one of the convolution layers is input to at least one subsequent convolution layer.

10 Claims, 10 Drawing Sheets

(56) References Cited

U.S. PATENT DOCUMENTS

| | | |
|---|---|---|
| 2018/0204051 A1* | 7/2018 | Li ................. G06V 10/764 |
| 2018/0293707 A1 | 10/2018 | El-Khamy et al. |
| 2019/0311223 A1* | 10/2019 | Wang ............... G06F 18/251 |
| 2020/0074623 A1* | 3/2020 | Matsumoto ........... G06T 7/0012 |
| 2021/0073267 A1* | 3/2021 | Chopra ................ G06N 3/04 |

OTHER PUBLICATIONS

Wang Lingfeng et al: "Reconstructed Densenets for Image Super-Resolution", 2018 25th IEEE International Conference on Image Processing (ICIP), IEEE, Oct. 7, 2018 (Oct. 7, 2018), pp. 3558-3562, XP033454602, DOI:10.1109/ICIP.2018.8451027.

Oz Navot et al: "Rapid super resolution for infrared imagery", Optics Express, vol. 28, No. 18, Aug. 28, 2020 (Aug. 28, 2020), p. 27196, XP093003784, DOI:10.1364/OE.389926.

* cited by examiner

D) Wheat in a field at midday.

E) Cucumber in Green house.

A)

B) Banana plant in Green house-50cm.

C) Banana plant in Green house-90cm.

| Method | Temperature Mean Error [C] | PSNR [dB] | SSIM | kMACs |
|---|---|---|---|---|
| Cucumber in greenhouse - 180 IR images | | | | |
| 32Ch, 8L, Convolutions | 0.18 | 33.15 | 0.938 | 409 |
| 32Ch, 8L, Depthwise | 0.18 | 33.12 | 0.937 | 333 |
| 16Ch, 16L, Convolution | 0.18 | 33.00 | 0.937 | 158 |
| SRCNN [12] | 0.18 | 32.05 | 0.943 | 1746 |
| VDSR [22] | 0.16 | 34.13 | 0.944 | 11814 |
| SRDenseNet [29] | 0.20 | 32.16 | 0.930 | 12228 |
| Bi-Cubic | 0.66 | 26.68 | 0.927 | - |

FIG. 8A

| Method | Temperature Mean Error [C] | PSNR [dB] | SSIM | kMACs |
|---|---|---|---|---|
| Cucumber in wild - 556 IR Images | | | | |
| 32Ch, 8L, Convolutions | 0.19 | 31.94 | 0.928 | 409 |
| 32Ch, 8L, Depthwise | 0.19 | 31.93 | 0.928 | 333 |
| 16Ch, 16L, Convolution | 0.19 | 31.83 | 0.927 | 158 |
| SRCNN [12] | 0.18 | 31.73 | 0.927 | 1746 |
| VDSR [22] | 0.17 | 33.05 | 0.933 | 11814 |
| SRDenseNet [29] | 0.20 | 31.22 | 0.922 | 12228 |
| Bi-Cubic | 0.98 | 22.80 | 0.908 | - |

FIG. 8B

| Method | Temperature Mean Error [°C] | PSNR [dB] | SSIM | MMACs |
|---|---|---|---|---|
| Banana Leaves in greenhouse - 6323 IR Images | | | | |
| 32Ch, 8L, Convolution | 0.36 | 29.15 | 0.913 | 409 |
| 32Ch, 8L, Depthwise | 0.35 | 29.23 | 0.915 | 333 |
| 16Ch, 16L, Convolution | 0.36 | 29.17 | 0.913 | 158 |
| SRCNN [12] | 0.32 | 30.93 | 0.926 | 1746 |
| VDSR [22] | 0.32 | 30.26 | 0.927 | 11814 |
| SRDenseNet [29] | 0.44 | 27.94 | 0.889 | 12228 |
| Bi-Cubic | 1.66 | 19.55 | 0.836 | - |

FIG. 8C

| Method | Temperature Mean Error [°C] | PSNR [dB] | SSIM | MMACs |
|---|---|---|---|---|
| Banana Leaves in wild - 2371 IR Images | | | | |
| 32Ch, 8L, Convolution | 0.17 | 34.20 | 0.936 | 409 |
| 32Ch, 8L, Depthwise | 0.17 | 34.19 | 0.936 | 333 |
| 16Ch, 16L, Convolution | 0.17 | 34.07 | 0.933 | 158 |
| SRCNN [12] | 0.17 | 33.27 | 0.943 | 1746 |
| VDSR [22] | 0.16 | 33.00 | 0.940 | 11814 |
| SRDenseNet [29] | 0.18 | 33.43 | 0.931 | 12228 |
| Bi-Cubic | 1.03 | 24.02 | 0.899 | - |

FIG. 8D

METHODS AND SYSTEMS FOR SUPER RESOLUTION FOR INFRA-RED IMAGERY

FIELD OF THE INVENTION

The present invention generally relates to image processing, and in particular, it concerns generating high-resolution (HR) images from low-resolution (LR) images.

BACKGROUND OF THE INVENTION

Infra-Red (IR) imagery is a result of sensing electromagnetic radiation emitted or reflected from a given target surface in the infrared bandwidth of the electromagnetic spectrum (approximately 0.72 to 12 microns). Images produced via current IR uncooled technology suffer from low-resolution, thus reducing the usefulness of these LR images.

Super-resolution imaging (SR) is a class of techniques that enhance (increase) the resolution of an imaging system, for example, recovering or generating a high-resolution image from one or more low-resolution input images.

Color digital images are composed of pixels, a color pixel composed of cluster of typically 4 red, green type 1 and green type 2, and blue pixels, such that pixels are made of combinations of primary colors represented by a series of codes (numerical values). Each color is referred to as a channel. For example, an image from a standard digital camera will have red, green and blue channels (RGB). A grayscale image has just one channel. YUV images are an affine transformation of the RGB color space, originated in broadcasting. The Y channel correlates approximately with perceived intensity, while the U and V channels provide color information

SUMMARY

According to the teachings of the present embodiment there is provided a method for generating high-resolution images from low-resolution images using a deep neural network approach for low-power devices. The embodiment can be implemented in general with an artificial neural network (ANN) and more specifically with a convolutional neural network (CNN). Embodiments include generating super-resolution (SR) images using low-power devices to enhance the ability for early detection, for example, in agriculture for phenotype identification, irrigation monitoring and early detection of disease in plants.

Resolution can depend on the application, for example, LR may be less than 160×120 pixels (19,600 pixels) and high (HR) and super (SR) may be 640×480 (307,200 pixels) or more.

Some methods are based on deep learning, where many of the calculations are done in the low-resolution (LR) domain. The results of each layer are aggregated together to allow better flow of information through the network.

Embodiments achieve results using depthwise-separable convolution with roughly 200K Multiplication-Adds computations (MACs), while contemporary convolutional neural network (CNN) based SR algorithms require around 1500K MACs (1500 kMACs). Thus, embodiments improve the functioning of computational devices, for example, by increasing power efficiency (decreasing power usage, cost) and increasing speed of computation (decreasing run-time). Embodiments also, for example, improve metrics of estimation (e.g. peak signal-to-noise ratio PSNR, structural similarity index measure SSIM). Embodiments combine both increased quality and lower complexity, as compared to conventional implementations, so embodiments can be implemented on low-power devices. As a result, new deep learning SR scheme for images is presented.

The method is operable, for example, embodiments have been successfully used with real agricultural images. For clarity in the current description, the non-limiting example of processing infra-red (IR) images is used.

Embodiments provide methods to perform SR using only a single IR image, while balancing between the metric quality of a super resolution image, designated $I^{SR}$, with the low-power requirements posed by the hardware of the IR cameras. The computational complexity of the present invention is considerably lower than similar networks.

In some embodiments, a network (neural network) uses a bottleneck layer from Kim et al. (2016)[12] combined with dense skip connections of Tong et al. (2017)[19] to preserve high quality performances of a deep network, with only a small portion of the recurred computation power. Calculations of the invention can be performed on the LR space to save computational costs, and the upscale to HR can be done, for example, using techniques from Shi et al. (2016) [17]. Results show that only a handful of skip-connections suffice. To further lower computational complexity, depth wise-separable convolution can be used, for example from (Chollet, 2017) [6].

According to the teachings of the present embodiment there is provided a system for image processing, the system including: a processing system containing one or more processors, and an artificial neural network including: an input layer including a memory location for storing an input image, one or more convolution layers, wherein the input layer is connected to a first convolution layer of the convolution layers, and a output layer connected to a last convolution layer of the convolution layers and including a memory location for storing an output image, wherein the layers include instructions for execution on the processing system, the input image is input to the input layer and to at least one of the convolution layers, an initial output of the input layer is input to at least one of the convolution layers, and a layer output of at least one of the convolution layers is input to at least one subsequent convolution layer.

In an optional embodiment, the processors are configured to execute instructions programmed using a predefined set of machine codes and the layers include computational instructions implemented in the machine codes of the processor.

In another optional embodiment, the input image is a low-resolution image and the output image is a super-resolution image.

In another optional embodiment, each of at least one of the convolution layers, includes: a respective convolution module accepting data to respective the convolution layer, a respective activation function processing output data from the respective convolution module, and a respective bottleneck layer processing output data from the respective activation function.

In another optional embodiment, the input image and the initial output are input to the bottleneck layer, and the bottleneck layer generates the layer output.

In another optional embodiment, the input image is input to each of the convolution layers. In another optional embodiment, the initial output is input to each of the convolution layers. In another optional embodiment, the layer output is input to each subsequent convolution layer.

In another optional embodiment, the output layer includes: a shuffleblock receiving the layer output of the last convolution layer and the input image and generating a shuffle-block output that is a higher resolution than the input image and the layer output, an interpolation module receiving the input image and generating an interpolated image that is higher resolution than the input image, and a final convolution receiving the shuffle-block output and the interpolated image and generating the output image.

In another optional embodiment, the network is trained with a training set based on high-resolution images and corresponding low-resolution images.

According to the teachings of the present embodiment there is provided a method of training the network of claim 1, the method including the steps of: receiving one or more sets of high-resolution images, applying one or more transformations to at least a subset of the sets of high-resolution images to generate at least one associated set of low-resolution images, creating a training set including the one or more sets of high-resolution images and the at least one associated set of low-resolution images, and training the network using the training set.

According to the teachings of the present embodiment there is provided a method for image processing, the method including the steps of: configuring an artificial neural network based on a training set of high-resolution images and corresponding low-resolution images, and inputting an input image to an input layer and to at least one convolution layer, generating an initial output from the input layer based on the input image and sending the initial output to at least a first convolutional layer of the convolution layers, and generating a current layer output of at least one of the convolution layers based on the input image, the initial output and any previous layer outputs, and sending the current layer output to at least one subsequent convolution layer, and generating an output image by an output layer based on the layer output of a last convolutional layer of the convolutional layers and the input image.

According to the teachings of the present embodiment there is provided a computer usable non-transitory storage medium having a computer program embodied thereon for causing a suitably programmed system to process images, by performing the steps of claim 9 when such program is executed on the system.

BRIEF DESCRIPTION OF FIGURES

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 8A to FIG. 8D, tables of experimental results of different datasets.

ABBREVIATIONS AND DEFINITIONS

Figure 1:
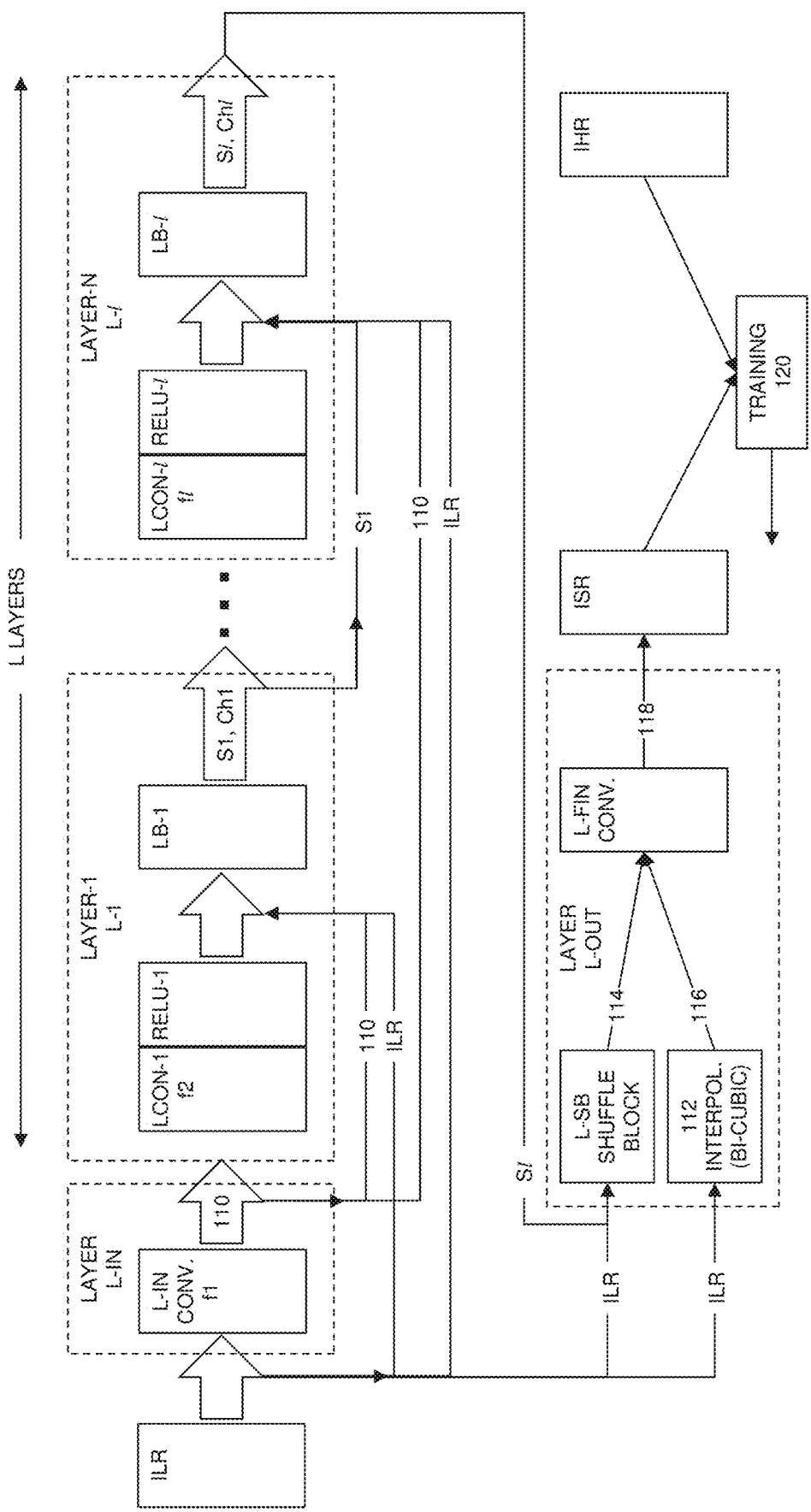
FIG. 1, a sketch of a convolution neural network that can be used to implement embodiments of the current invention.

For convenience of reference, this section contains a brief list of abbreviations, acronyms, and short definitions used in this document. This section should not be considered limiting. Fuller descriptions can be found below, and in the applicable Standards.

$\alpha$ The upscale factor for the super resolution.

Bottleneck Layer containing fewer nodes compared to the previous layers. Can be used to obtain a representation with reduced dimensionality. Used as a learning layer giving a significant coefficient for the processed data. Can be used to represent data in a different subspace.

Ch The number of channels for each layer of the network. Also known as features.

$f_l$ Output of the lth convolution module.

The number of filters in both input and output is Ch for all l.

I Image.

IR Infra-red.

ILR, $I_{LR}$, $I^{LR}$ The low-resolution input images. Dimensions are H×W.

IHR, $I_{HR}$, $I^{HR}$ The high-resolution label images. Used to teach the network how to create ISR. Dimensions are $\alpha H \times \alpha W$.

ISR, $I_{SR}$, $I^{SR}$ A super-resolved version of Ir. Its dimensions are $\alpha H \times \alpha W$.

HR High-resolution.

L The overall number of layers in the network.

l, ln, L-n A layer in the network, the n-th layer in the network

LCON Convolutional module.

LCON-l The lth convolutional module.

LR Low-resolution.

MAC Multiply-accumulate operation.

PReLU Parametric rectified linear activation unit implements a rectified linear activation function, a piecewise linear function that will output the input directly if it is positive, otherwise, it will output a value corresponding to a learned parameter. Used as an exemplary, typical implementation of an activation function.

S Output of a bottleneck layer. The "layer output".

Sl The output of the lth bottleneck layer.

The number of filters in the input is l·Ch.

The number of filters in the output is Ch for all l.

SR Super-resolution.

$\vartheta$ Learned weights for the bottleneck layers. Each filter has 1×1 spatial dimension.

$\theta$ Learned weights for the convolution layers (modules). Each filter has 3×3 spatial dimensions.

$\Phi$ Non-linear activation function.

DETAILED DESCRIPTION—FIRST EMBODIMENT—FIGS. 1 to 9

The principles and operation of the system and method according to a present embodiment may be better understood with reference to the drawings and the accompanying description. A present embodiment is a system and method for generating high-resolution images from low-resolution images.

The following paragraphs describe different embodiments of the present invention. The following embodiments are exemplary only, generally using IR images. The invention should not be limited to the particular embodiments described herein. For example, the low-resolution images (for example the input low-resolution image ILR) can be IR images, or other images, such as listed following. Other embodiments are contemplated as well. For example, work has been done in the 7.5-14 micron range. It is foreseen that based on the current description other ranges of the electromagnetic spectrum can be processed, for example, including but not limited to visual light, IR, terahertz (ThZ), and X-Ray spectrums, as well as other imagery systems, for example, electron-beam imagery, MRI, ultra-sound, satellite imagery, microscopy, mobile phone applications, and radar.

Embodiments have already been demonstrated, and can solve real-world problems, for example improving detection of diseases and irrigation defeatist in crops using low-power IR cameras. Embodiments can be used in real-time, with low-power devices, in field-conditions suitable for agriculture and environmental uses.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

An artificial neural network for processing low-resolution images to generate super-resolution images includes feed-forward connections between layers. The network includes an input layer, one or more convolution layers, wherein the input layer is connected to a first convolution layer of the convolution layers, and an output layer connected to a last convolution layer of the convolution layers. An input image is input to the input layer and to at least one of the convolution layers, an initial output of the input layer is input to at least one of the convolution layers, and a layer output of at least one of the convolution layers is input to at least one subsequent convolution layer.

Materials and Method

Data

The training was done on DIV2K dataset Agustsson et al. [1] and Flicker2K disclosed in Timofte, et al. [18]. The images in these datasets has a resolution of 2 k so each image contain fine details. To obtain low-resolution images, the training set is processed and preferably each image is transformed into a lower resolution image, for example each image is down-sampled using bi-cubic interpolation. The training is done on the Y channel because of the proportionality between temperature and pixel intensity shown below.

The training results are evaluated on SetS Bevilacqua et al. [3], Set14 Zeyde et al. [21] and Urban100 from Huang et al. [11]. The metrics used are peak signal-to-noise ratio (PSNR) and the structural similarity index (SSIM). Both metrics were calculated between generated super-resolution images ISR and high-resolution images IHR using compare psnr( ) and compare ssim( ) from the skimage library in python. The borders of the images were cropped by 10 pixels for each border to neglect borders effects.

Aside from these training testing sets, several test sets of different plants were gathered using Therm-App TH Infra-Red camera [23] at mid-day. See below in reference to FIG. 8A to FIG. 8D, for information and results on a cucumber test set.

Thermal images tend to be noisy. The characteristic noise in the IR images was analyzed and found to be Gaussian distributed with varying means and variances. To provide better super-resolution estimations, the training was done in two stages: first using down sampled images versus their high-resolution source, and second by injecting the characteristic noise to the down sampled images versus their high-resolution source.

A feature of embodiments is training the network to ignore noise in the input images. During the training process, the filters are adjusted to notice (only) significant features in the images.

The Network

Refer to FIG. 1, a sketch of a convolution neural network 100 that can be used to implement embodiments of the current invention. A low-resolution IR image denoted $I^{LR}$ is propagated through/layers in the network 100 and the resulting output of the network 100 is a super resolution (SR) image $I^{SR}$ approximation of a high-resolution image $I^{HR}$. The convolution neural network 100 decomposes $I^{LR}$ into Ch filters. Each layer of the network 100 has Ch channels (also known as features). The super resolution scale is denoted a. In the current description the network 100 is trained to achieve an upscale factor for the super resolution $\alpha \in 2, 4$.

The network has one initial convolution layer L-IN for the input, l convolution layers that are concatenated together and one more final convolution layer L-OUT for the output. All in all (2+L) convolutions and l bottleneck-layers. While the intermediate, or hidden layers l are referred to as "convolutional layers" (being L in number), convolutions are not limited to being implemented only in the intermediate layers, and convolutions can also be done in other locations, for example, in the input L-IN and the output L-OUT layers.

The initial convolution layer L-IN is used to cast the low-resolution input image ILR into an initial feature space.

The output of each convolution LCON module of layer l is fed to a non-linear activation function, applied element-wise to the result. In the current description, a non-limiting implementation of the activation function uses PReLU. The result from the activation function PReLU is aggregated via concatenation of the outputs of the previous layers l and to the input image $I^{LR}$. The concatenated matrix goes through a bottleneck layer LB which outputs Ch filters. For each bottleneck layer or "bottleneck block" LB-n (where "n" is an integer denoting the layer number), all preceding layers l of the network are concatenated together and are convoluted with the bottleneck layer LB. Denoting the Convolution between two matrices A and B as A*B and the concatenation between these matrices as {A,B}. The mathematical formulation of the bottleneck layer is as follows:

$$S_l = \phi(\vartheta_l * \{I^{LR}, f_1, \ldots, f_l\}) \qquad \text{Equation (1)}$$

where $S_l$ is the output of the lth bottleneck layer, $\vartheta_l$ denotes the learned weights of the bottleneck layer, with l·Ch filters as input and Ch filters as output. φ the non-linear activation function and $f_l$ the output from the l'th convolution module. The bias term is omitted for brevity.

The bottleneck layer LB is different from a pooling layer, giving significant features based on data intrinsic to the image itself. In part, this feature of the bottleneck layer LB saves energy in the system (network) as output of the bottleneck layer LB will only have the most significant features of the respective layer (processing of the layer, which may include inputs from previous layers). The bottleneck layer LB is typically a learning layer, trained to give only the most significant coefficients in regards to a feature space. The bottleneck layer LB can process input information and generate a representation in a different subspace. In part, the bottleneck layer LB helps keep (number of) features low, by choosing which features are most significant.

The network is composed of l convolution modules, each in a corresponding convolution layer, that can be described as follows:

$$\begin{cases} f^1(I^{LR}; \theta_1) = \phi(\theta_1 * I^{LR}) \\ f^l(f^{l-1}; \theta_l) = \{f^{l-1}, \phi(\theta_l * S_{l-1})\} \, l \in 2, ..., L \end{cases} \quad \text{Equation (2)}$$

Where $\theta$ are learned weights with 3×3 spatial dimensions with Ch filters. While a variety of non-linear activation functions can be used, for simplicity in this description, PReLU proposed by He, et al. (2015)[9] will be used as a non-limiting example of the non-linear activation function.

Depth wise separable convolution modules as proposed by Chollet (2017) [6] can be used to lower computational cost. An exemplary usage of depth wise separable convolution is described below.

Figure 2:
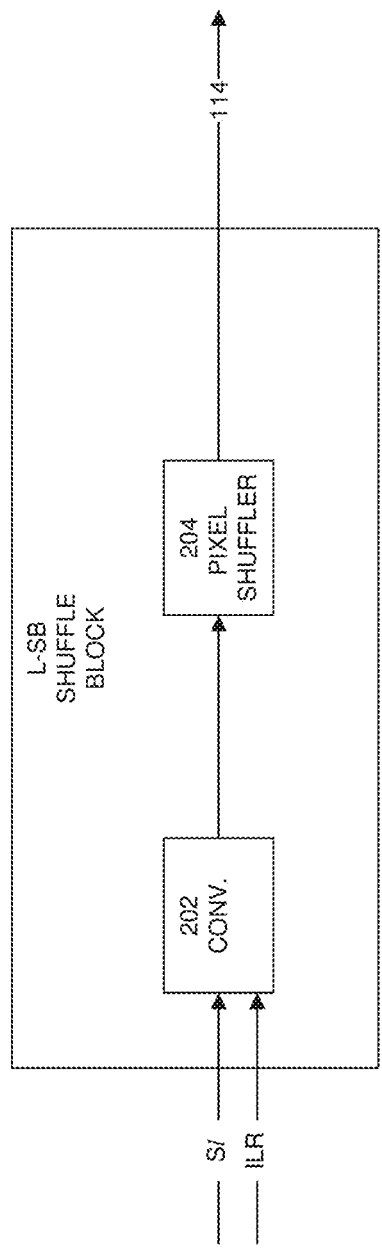
FIG. 2, a sketch of a shuffle block.

Refer now also to FIG. 2, a sketch of a shuffle block L-SB. The shuffle block L-SB includes a convolution layer 202 and a pixel shuffler 204. The upscale from $I^{LR}$ to $I^{SR}$ is performed in the Shuffle Block L-SB, producing a shuffle-block output 114 that is a higher resolution than the input image ILR and layer output (Si). This method is described in Shi, et al. (2016) [17].

In the current embodiment, the final layer L-OUT of the network 100 includes a final convolution L-FIN with Ch+1 filters as input. The extra channel is a high-resolution image generated from the low-resolution input image ILR. One exemplary implementation for generating the extra channel is to use a bi-cubic interpolation 112 of the input low-resolution image ILR to generate an extra channel high-resolution interpolation 116. As is known in the art, the bi-cubic interpolation 112 inputs low-resolution data (the low-resolution image ILR) and spreads the low-resolution information across the spatial domain to generate high-resolution data (a high-resolution image, interpolation 116). This high-resolution interpolation 116 contains only low-resolution information. The high-resolution interpolation 116 (high-resolution image) is concatenated to the shuffle-block output 114 before going through the final concatenation L-FIN. The output of the shuffle-block 114 contains the high-resolution information. This concatenation and convolution enables the network 100 to learn only the high-resolution difference between $I_{LR}$ and $I_{HR}$. The final layer L-OUT outputs a single channel 118 of a super-resolution image ISR, without an activation function.

The network 100 learns high frequency, significant features, and then combines this learning with processing of low-resolution images. Each layer can be trained to find different aspects in an image. For example, the first layer, layer-1 (L-1) may be trained (weights of the convolution matrix weighted) to find edges, and the second layer, layer-1 (L-2) may be trained to find circles in the LR images.

Figures 3A, 3B, 3C, 3D:
FIG. 3A to 3D, photographs illustrating the final layer output process.

Refer also to FIG. 3A to 3D, photographs illustrating the final layer output process. FIG. 3A is a low-resolution image. FIG. 3B shows the Bi-cubic interpolation 116 of the low-resolution image ILR. FIG. 3C shows the "high-resolution" information 114 learned by the main network pipeline (L). These interpolation data 116 and the "high-resolution" data 114 are summed up in the final layer convolution L-FIN. In the training process, the result of this summation is minimized to resemble the high-resolution IHR ground truth image FIG. 3D.

The input low-resolution image $I^{LR}$ has dimensions H×W with 1 channel. The channel represents the object's temperature of the low-resolution image $I^{LR}$ as $16_{bis}$. Before entering the network, the $I^{LR}$ can be standardized to the range (0,1) such that $$T^{LR} = \frac{I^{LR} - \min[I^{LR}]}{\max(I^{LR} - \min[I^{LR}])} \quad \text{Equation (3)}$$

Network training 120 can be done by minimizing the error between a ground truth HR (high-resolution) image IHR and a work output (SR image) ISR. As a cost function, an absolute mean error known as $L_1$ norm, which is robust to outliers, is applied between the $I^{SR}$ and $I^{HR}$ in pixel domain. Formally:

$$\mathcal{L}_{SR}(\theta) = \frac{1}{H \cdot W} \sum_{i=0}^{H} \sum_{j=0}^{W} |I_{i,j}^{SR} - I_{i,j}^{HR}| \quad \text{Equation (4)}$$

where H, W are height and width respectively. $\theta$ are the learned weights of the network. A list of parameters is provided above in the section "ABBREVIATIONS AND DEFINITIONS".

Bottleneck Layers

Bottleneck layers LB are a 1×1 convolution where the number of output filters is Ch. This process was described in Bishop (2006)[4] and used by Shelhamer et al. (2017)[16]. The bottleneck layer LB has several effects. For example, the bottleneck layer LB helps mitigate vanishing gradients. In another example, the most important features are chosen using the computationally efficient and parameter-conservative bottleneck layer, so operations in other convolution layers are always applied only to Ch channels.

The Relation Between Temperature and Pixel Intensity

The Stefan-Boltzmann equation formulates the relation between temperature of a surface to irradiance of the surface. In a typical outdoor temperature (e.g. 280-320$_K$) the target and the ambient temperature are similar, such that the change in radiation power in this range can be approximate as linearly dependent to the change of the body temperature relative to the ambient temperature.

$$P(T) = \alpha \cdot \sigma T^4 = \alpha \cdot \sigma (T_0 + \Delta T)^4 \approx \underbrace{\alpha \cdot \sigma (T_0)^4}_{P_0} + 4\alpha \cdot \sigma (T_0)^3 \Delta T \quad \text{Equation (5)}$$

Where P is the radiant power, $T_0$, $P_0$ are the reference ambient temperature and associated radiance respectively, $\sigma$ is the Stefan-Boltzmann coefficient, $\alpha$ is a proportion factor. Eq. (4) present the Taylor expansion around the ambient temperature. Indeed, in a narrow temperature range, the change in radiation is linearly depended upon the change in object temperature ΔT relative to the ambient temperature $T_0$.

The IR radiation associated with the object temperature is concentrated by the camera's lens on the camera's detector. By heating the pixels, the concentrated IR radiation changes the micro bolometers resistance which in turn linearly changes the pixels reading. Here, the resulted grey scale presentation of the scene is assumed to be linearly connected to the image grey scale.

This relation allows training the model on regular visible images and still achieve satisfactory results, even without fine-tuning on IR images. Fine-tuning can further enhance performance due to differences in statistics between IR and visible images.

Computational Cost

The operations done in each layer of the network 100 are mainly dot products:

$$y = w_0 \cdot x_0 + \ldots + w_n \cdot x_n \qquad \text{Equation (6)}$$

Where $\underline{x}$ and $\underline{w}$ are vectors and y is a scalar. A multiply accumulate operation (MAC) is defined as a single multiplication and a single addition operation. In Equation 6 there are n MAC operations. Note that in terms of floating-point operations (FLOP), there are 2n−1 operations for a dot-product.

Let $f_l$ be the feature map of the l'th layer with size Ch×H×W where H×W are the spatial dimensions of the feature map and Ch is the number of channels. For a series of convolution layers with K, $C_{in}$, $C_{out}$ as the kernel size, number of input and output channels respectively, for each pixel in the feature map a dot-product is taken for a $K^2$ window across all $C_{in}$ and the process is repeated for $C_{out}$ channels:

$$H \times W \times K^2 \times Cin \times Cout$$

Meaning that a bottleneck-layer where K=1 has:

$$H \times W \times Cin \times Cout$$

For depthwise-separable convolution, the calculations for each pixel are done separately for each channel, so only $C_{in}$ times. The resulting number of MACs is a factor of $C_{out}$ less than for a convolution layer:

$$H \times W \times K^2 \times C_{in}$$

In the network 100, the first (L-1) and last (L-1) layers are typically convolution layers, but other layers can be depthwise-separable convolution. Henceforth $C_{in} \equiv C_{out} \equiv Ch$ for brevity. MACs in the initial convolution L-IN, final convolution L-FIN and shuffle block L-SB respectively:

$$\#Conv_{in} = H \times W \times K^2 \times 1 \times Ch$$

$$\#Conv_{out} = \alpha^2 \times H \times W \times K^2 \times Ch \times 1$$

$$\#ShuffleBlock = \alpha^2 \times H \times W \times K^2 \times Ch^2$$

where α is the upscale factor of the output. The number of MACs for l convolution layers with bottlenecks:

$$\sum_{l=1}^{L} [H \times W \times K^2 \times Ch^2] + \sum_{l=1}^{L} [H \times W \times Ch^2] = H \times W \times Ch^2 \times L \times (K^2 + 1)$$

The number of MACs for l depthwise-separable convolution layers with bottlenecks:

$$\sum_{l=1}^{L} [H \times W \times K^2 \times Ch] + \sum_{l=1}^{L} [H \times W \times Ch^2] = H \times W \times Ch^2 \times 1 \times Ch^{-1} K^2 + 1)$$

meaning that the factor between the number of MACs performed between the depthwise-separable convolution implementation and the convolution implementation is:

$$\xi = \frac{Ch^{-1} K^2 + 1}{K^2 + 1} \qquad \text{Equation (7)}$$

with ζ as a reduction factor. A comparison between different networks can be seen in FIG. 8A to FIG. 8D. Bias terms and PReLU are neglected for brevity, as each adds $C_{out}$ MACs, which is negligible.

Training

Refer again to FIG. 1, the training module 120 includes a variety of processing and functions for inputting training data, processing and preparing the training data, configuring the initial system, running the training, etc. Low-resolution (LR) images, and images with noise, present significant problems to determining high-resolution features in an imaged location. While LR images may be readily available from a variety of sources, or low-cost to acquire (via low-cost equipment, compared to equipment for collecting high-resolution images) or be required to be captured using low-power devices (often inherently LR), a problem is how to extract significant features from these LR images. In addition, conventional processing of LR images to generate high-resolution (HR) images is typically high cost, long time, and high power, compared to processing lower resolution images. As described throughout this description, various elements of embodiments are trained to process and extract significant features from LR images, thus improving the operation of the computational systems on which embodiments run, reducing cost, time, and power consumption, compared to conventional techniques for processing HR images and existing techniques for processing LR images.

An exemplary network 100 was implemented using Paszke et al. [15]. The mini-batch size was set to 16. Each image was cropped randomly to 192×192 to create high-resolution images $I^{HR}$ and then the high-resolution images $I^{HR}$ were down-scaled with a bi-cubic kernel by ×2 or ×4 to create low-resolution images $I^{LR}$ for training the network 100. The training dataset was augmented with horizontal flips and 90 degree rotations. All image processing was done using python PIL image library.

All network trainable weights are initialized via the method proposed by He, et al. (2015)[9], with a scaling factor of 0.1 as proposed by Wang, et al. (2018)[20]. The network is optimized using gradient descent with Kingma et al. [13] with $\beta_1 = 0.9$, $\beta_2 = 0.999$ and the initial learning rate set to $5 \cdot 10^{-4}$. The learning rate was halved at $10^4$ and $10^5$ iterations. The training ran for $3 \cdot 10^5$ iterations.

The training was done using NVIDIA 2080ti GPU. Each permutation of the network was trained for 300 k iterations.

EXAMPLES

Refer to FIG. 8A to FIG. 8D, tables of experimental results of different datasets for upscale factor of α=4. A method of the invention was evaluated on a database composed of 9630 outdoor IR images of four crops, cucumbers and banana leaves in the wild and in a greenhouse. Where performances compared in terms of restoration temperature PSNR, and MACs against other previously suggested state-of-the-art SR networks. In the current figures, the average results for the four croups, A) cucumber in greenhouse, B) cucumber in wild, C) banana leaves in greenhouse, and D) banana leaves in wild, are presented.

For convenience, the tables of the current figures are separated into of four sub-tables. Each sub-table is composed of seven rows. Rows 1-3 present different implementations of the network. Rows 4-7 present the performances of three previously suggested SR networks-SRCNN Freeman et al.[8], SRDenseNet Wang et al. [20], VDSR Kingma et al. [13] and Bi-Cubic interpolation. For convenience, the order of the rows is repeated through the sub tables. Observing the results, the network out-preforms SRCNN Freeman et al. [8], SRDenseNet Wang et al. [20], and Bi-Cubic interpolation both in restoration quality and with lower MACs. While VDSR Kingma et al. [13] achieves the best restoration results—about 1 dB better in PSNR terms which is only 3% beater in absolute performance and 0.0220 better in mean temperature error terms, however performing ×28 or more additional MACs. Compering the relative improvement to the computation costs, the method suggests a cost effective implementation.

Figure 4:
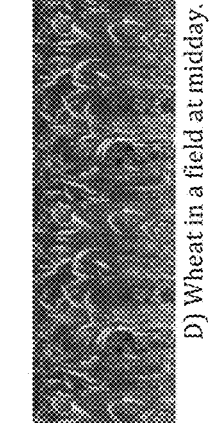
FIG. 4 and FIG. 5, images of SR results.
Figure 5:
Figure 5:
Figure 5:
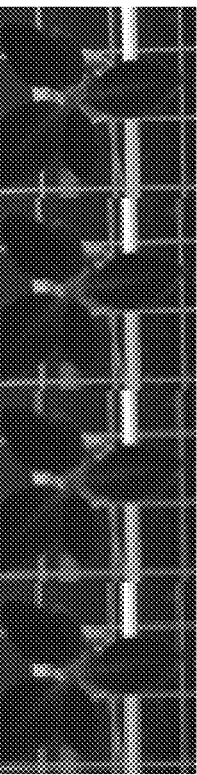
Figure 5:
Figure 5:
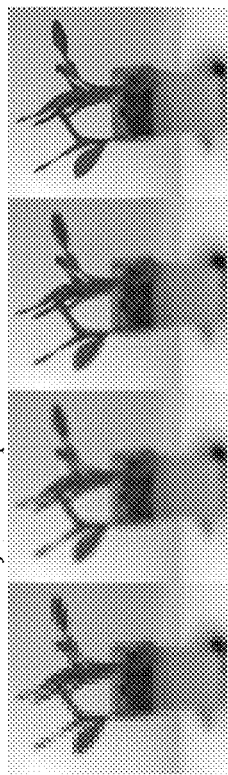
Figure 6:
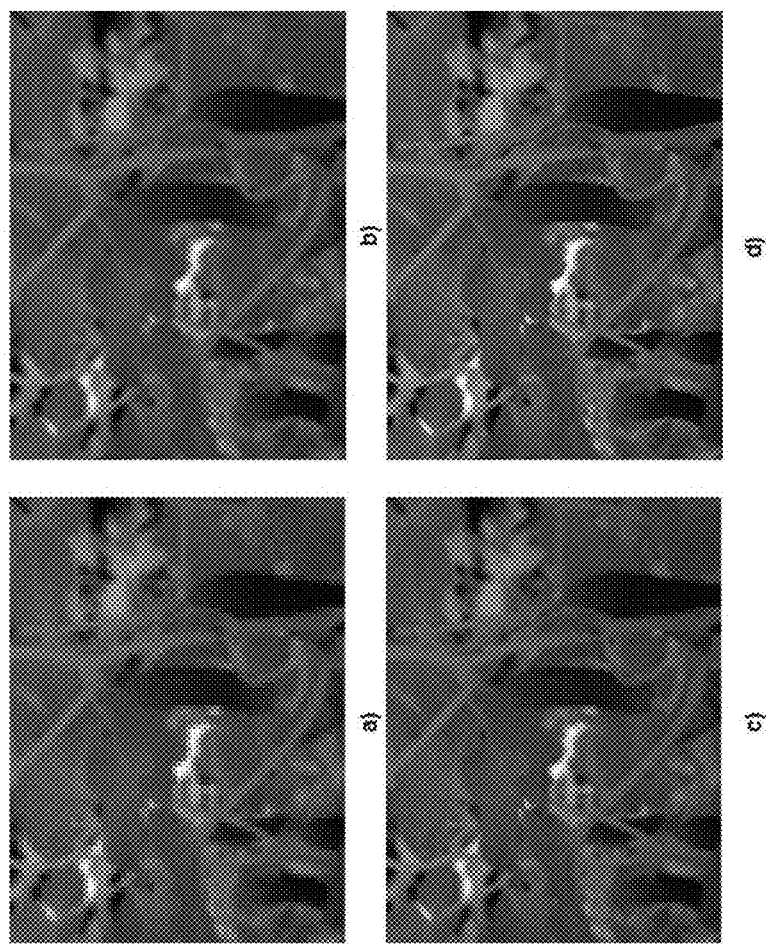
FIG. 6, zoomed-in examples.

Refer to FIG. 4 and FIG. 5, images of SR results. Typical examples for five different datasets are presented one below the other. From left to right columns content is: Low-resolution input, bi-cubic interpolation results, VDSR restoration results and the results of the method. The current figures show SR results for ×2 and ×4 SR respectively. These show a comparison between $I^{LR}$, Bi-Cubic, $I^{SR}$ and VDSR proposed by Kim, et al. (2016)[12]. Observing the figures, the method appears in the same level as the VDSR, this is done with a significantly lower computation effort. Both methods perform better than Bi-Cubic interpolation in both appearance and metrics. In FIG. 6, presented is a zoomed-in replica of FIG. 5e (Cucumber in Green house). Observing the results, the method appears much better than VDSR Kingma et al. [13], and is discussed further below.

All results were obtained while running on a desk top computer equipped with an i7 processor.

Refer now to FIG. 6, zoomed-in examples. In the current figure, zoomed-in examples of 4× SR a) is the low-resolution image, b) is the Bi-Cubic interpolation results, c) is the SR results of VDSR, and d) is the SR results of the method ×4.

As noted above, embodiments have, and can solve real-world problems, for example improving detection of diseases in crops using low-power IR cameras. Embodiments can be used in real-time, with low-power devices, in field-conditions suitable for agriculture and environmental uses.

As seen in the tables of FIG. 8A to FIG. 8D, the restoration metrics are on-par with state-of-the-art methods in terms of PSNR, SSIM and temperature estimation, while requiring 4-30 times less MACs. VDSR by Kim et al. (2016)[12] achieved the best estimation results, which were only roughly 1 dB (3% relative improvement) and 0.022 C° better than the method of the current embodiment, but with ×28 the computational complexity.

As for the appearance of restoration, as seen in FIG. 3 and FIG. 4, the model produces visually pleasing results. If fact FIG. 5 shows an enlarged comparison between $I^{LR}$, Bi-Cubic interpolation, $I^{SR}$ and VDSR Kingma et al. [13]. Results of the current method are sharper and look better than other results including VDSR. A reason may include the propagation of features from all layers throughout the network using bottleneck layers. Moreover, VDSR is trained using the minimization of L2 norm, which improves the PSNR but tends to produce blurry results.

Thus, the method of the current embodiment provides a suitable solution in both quality and complexity.

Figure 9:
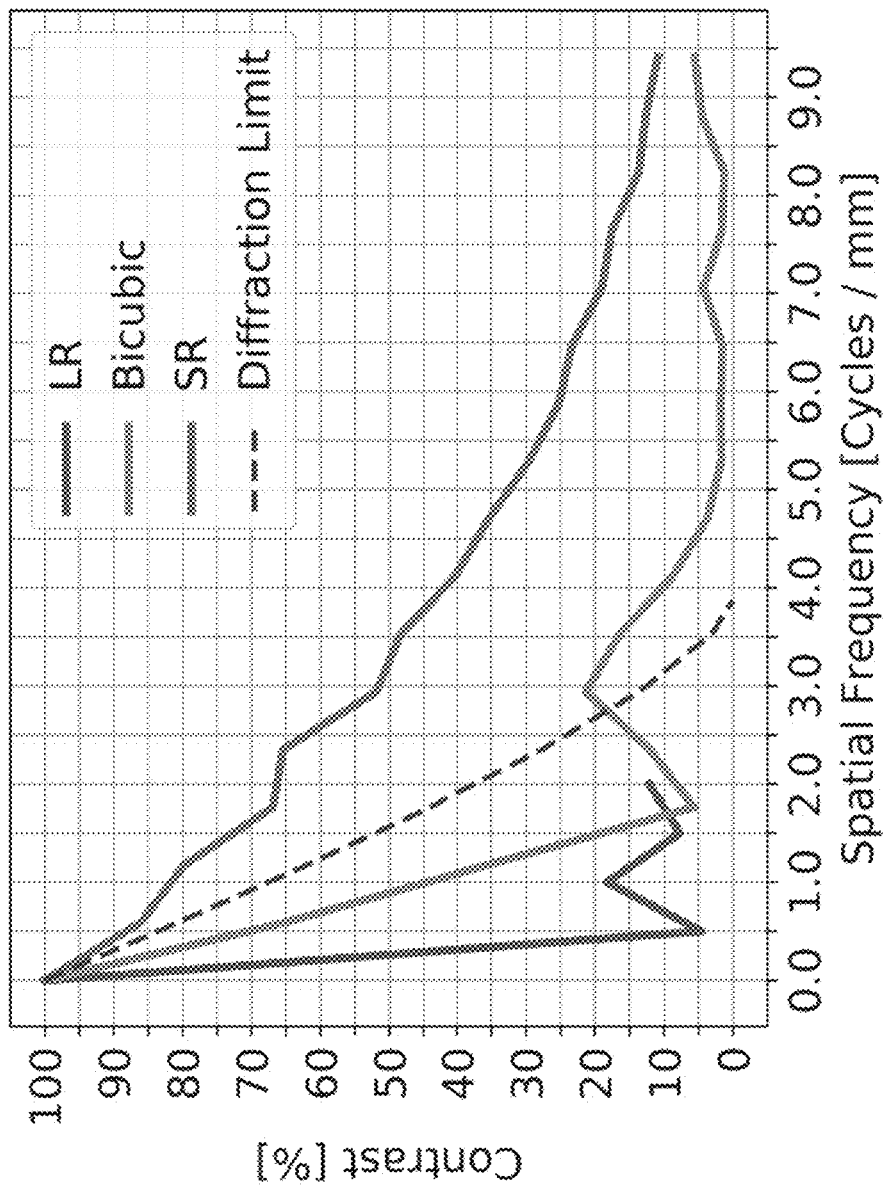
FIG. 9, results of the modulation transfer function (MTF) of the embodiments.

Refer to FIG. 9, a graph of results of the embodiment on the modulation transfer function (MTF) of an IR camera. The MTF gives a notion of the resolution of a given imaging system. As seen in the current figure, the embodiment offers an improvement of ×4 in the cutoff frequency of the imaging system—the sampling resolution of the LR image is 0.4 mm, and the embodiments gives a true ×4 improvement to 0.1 mm (as seen in the current figure). Moreover, the embodiment offers significant improvement over the diffraction limited MTF of a circular aperture (as seen in the current figure).

The following references are listed by number in brackets [ ] in the text above, and are all incorporated by reference in their entirety herein.

[1] E. Agustsson and R. Timofte. Ntire 2017 challenge on single image superresolution: Dataset and study. In *The IEEE Conference on Computer Vision and Pattern Recognition (CVPR) Workshops*, July 2017. 8

[2] B. Berger, B. Parent, and M. Tester. High-throughput shoot imaging to study drought responses. *Journal of Experimental Botany*, 61(13):3519— 3528, 07 2010. ISSN 0022-0957. doi: 10.1093/jxb/erq201. URL https://doi.org/10.1093/jxb/erq201. 1

[3] M. Bevilacqua, A. Roumy, C. Guillemot, and M. line Alberi Morel. Low complexity single-image super-resolution based on nonnegative neighbor embedding. 8

[4] C. M. Bishop. *Pattern Recognition and Machine Learning (Information Science and Statistics)*. Springer-Verlag, Berlin, Heidelberg, 2006. ISBN 0387310738. 4

[5] D. Bulanon, T. Burks, and V. Alchanatis. Image fusion of visible and thermal images for fruit detection. *Biosystems Engineering*, 103:12-22, 05 2009. doi: 10.1016/j.biosystemseng.2009.02.009. 1

[6] F. Chollet. Xception: Deep learning with depthwise separable convolutions. 2017 *IEEE Conference on Computer Vision and Pattern Recognition (CVPR)*, pages 1800-1807, 2017. 2, 4

[7] C. Dong, C. C. Loy, K. He, and X. Tang. Image super-resolution using deep convolutional networks. *IEEE Transactions on Pattern Analysis and Machine Intelligence*, 38(2):295-307, February 2016. ISSN 0162-8828. doi: 10. 1109/TPAMI.2015.2439281. 2, 10

[8] W. T. Freeman, T. R. Jones, and E. C. Pasztor. Example-based superresolution. *IEEE Computer Graphics and Applications*, 22(2):56-65, March 2002. ISSN 0272-1716. doi: 10.1109/38.988747. 2

[9] K. He, X. Zhang, S. Ren, and J. Sun. Delving deep into rectifiers: Surpassing human-level performance on ImageNet classification. *IEEE International Conference on Computer Vision (ICCV* 2015), 1502, 02 2015. doi: 10.1109/ICCV.2015.123. 4, 8

[10] Z. He, S. Tang, J. Yang, Y. Cao, M. Y. Yang, and Y. Cao. Cascaded deep networks with multiple receptive fields for infrared image super-resolution. *IEEE Transactions on Circuits and Systems for Video Technology*, PP:1-1, 08 2018. doi: 10.1109/TCSVT.2018.2864777. 2, 10

[11] J. Huang, A. Singh, and N. Ahuja. Single image super-resolution from transformed self-exemplars. In 2015 *IEEE Conference on Computer Vision and Pattern Recognition (CVPR)*, pages 5197-5206, June 2015. doi: 10. 1109/CVPR.2015.7299156. 8

[12] J. Kim, J. K. Lee, and K. M. Lee. Accurate image super-resolution using very deep convolutional networks. In *The IEEE Conference on Computer Vision and Pattern Recognition (CVPR Oral)*, June 2016. 2, 10

[13] Kingma, P. Diederik, and J. Ba. Adam: A method for stochastic optimization, 2014. URL http://arxiv.org/abs/1412.6980. cite arxiv:1412.6980Comment: Published as a conference paper at the 3rd International Conference for Learning Representations, San Diego, 2015. 8

[14] M. Mller, V. Alchanatis, Y. Cohen, M. Meron, J. Tsipris, A. Naor, V. Ostrovsky, M. Sprintsin, and S. Cohen. Use of thermal and visible imagery for estimating crop water status of irrigated grapevine*. *Journal of Experimental Botany*, 58(4):827-838, 09 2006. ISSN 0022-0957. doi: 10.1093/jxbier1115. URL https://doi.org/10.1093/jxbier1115. 1

[15] A. Paszke, S. Gross, S. Chintala, G. Chanan, E. Yang, Z. DeVito, Z. Lin, A. Desmaison, L. Antiga, and A. Lerer. Automatic differentiation in PyTorch. In *NIPS Autodiff Workshop*, 2017. 8

[16] E. Shelhamer, J. Long, and T. Darrell. Fully convolutional networks for semantic segmentation. *IEEE Trans. Pattern Anal. Mach. Intell.*, 39(4): 640-651, April 2017. ISSN 0162-8828. doi: 10.1109/TPAMI.2016.2572683. URL https://doi.org/10.1109/TPAMI.2016.2572683. 4

[17] W. Shi, J. Caballero, F. Husz'ar, J. Totz, A. P. Aitken, R. Bishop, D. Rueckert, and Z. Wang. Real-time single image and video super-resolution using an efficient sub-pixel convolutional neural network. 2016 *IEEE Conference on Computer Vision and Pattern Recognition (CVPR)*, pages 1874-1883, 2016. 5

[18] R. Timofte, E. Agustsson, L. Van Gool, M.-H. Yang, L. Zhang, B. Lim, et al. Ntire 2017 challenge on single image super-resolution: Methods and results. In *The IEEE Conference on Computer Vision and Pattern Recognition (CVPR) Workshops*, July 2017. 8

[19] T. Tong, G. Li, X. Liu, and Q. Gao. Image super-resolution using dense skip connections. In 2017 *IEEE International Conference on Computer Vision (ICCV)*, pages 4809-4817, October 2017. doi: 10.1109/ICCV.2017.514. 2, 10

[20] X. Wang, K. Yu, S. Wu, J. Gu, Y. Liu, C. Dong, Y. Qiao, and C. C. Loy. Esrgan: Enhanced super-resolution generative adversarial networks. In *The European Conference on Computer Vision Workshops (ECCVW)*, September 2018. 8

[21] R. Zeyde, M. Elad, and M. Protter. On single image scale-up using sparse representations. In J.-D. Boissonnat, P. Chenin, A. Cohen, C. Gout, T. Lyche, M.-L. Mazure, and L. Schumaker, editors, *Curves and Surfaces*, pages 711-730, Berlin, Heidelberg, 2012. Springer Berlin Heidelberg. ISBN 9783-642-27413-8. 8

[22] A. Zomet and S. Peleg. Multi-sensor super-resolution. In *Proceedings of the Sixth IEEE Workshop on Applications of Computer Vision*, WACV '02, pages 27-, Washington, DC, USA, 2002. IEEE Computer Society. ISBN 0-7695-1858-3. URL http://dl.acm.org/citation.cfm?id=832302.836830. 2

[23] https:/ltherm-app.com ltherm-app-thermography/

While the invention has been described with respect to a limited number of embodiments, it will be appreciated that many variations, modifications and other applications of the invention may be made. Therefore, the claimed invention as recited in the claims that follow is not limited to the embodiments described herein.

It is well known in the field that it is frequently impossible for humans to perform the calculations of artificial intelligence (AI) and machine learning (ML) systems, such as the current embodiment. For example, the processing that the network 100 performs on a given data set is typically not pre-programmed and may vary depending on dynamic factors, such as a time at which the input data set is processed and which other input data sets were previously processed.

Figure 7:
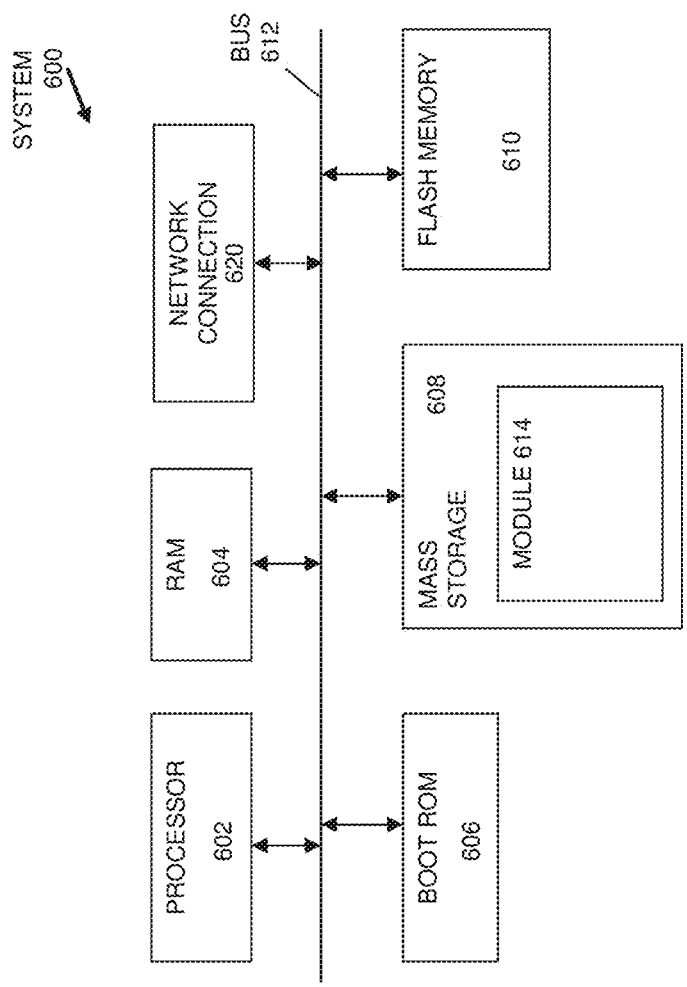
FIG. 7, a high-level partial block diagram of an exemplary system configured to implement the network.

The current network 100 is a carefully designed framework that, in part, uses algorithms. That is, some algorithms may be used as building blocks for the network 100 framework, within which the system will itself learn its own operation parameters FIG. 7 is a high-level partial block diagram of an exemplary system 600 configured to implement the network 100 of the present invention. System (processing system) 600 includes a processor 602 (one or more) and four exemplary memory devices: a random access memory (RAM) 604, a boot read only memory (ROM) 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), graphics processing unit (GPU), and application-specific integrated circuit (ASIC) element(s). The processor 202 is formed of one or more processors, for example, hardware processors, including microprocessors, for performing functions and operations detailed herein. The processors are, for example, conventional processors, such as those used in servers, computers, and other computerized devices. For example, the processors may include x86 Processors from AMD and Intel, Xenon® and Pentium® processors from Intel, as well as any combinations thereof. Any instruction set architecture may be used in processor 602 including but not limited to reduced instruction set computer (RISC) architecture and/or complex instruction set computer (CISC) architecture. A module (processing module, neural network node or layer) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the image processing methodology described herein. Other examples of such non-transitory computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Note that a variety of implementations for modules, processing, and layers are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A system for image processing, the system comprising a processing system containing one or more processors, and
an artificial neural network (100), the latter comprising:
    (i) an input layer (L-IN) including a memory location for storing an input image (ILR),
    (ii) one or more (L) convolution layers (L-n), wherein said input layer (L-IN) is connected to a first convolution layer (L-1) of said convolution layers (L-n), and
    (iii) an output layer (L-OUT) connected to a last convolution layer (L-l) of said convolution layers (L-n) and including a memory location for storing an output image (ISR), said output layer (L-OUT) comprising:
        (a) a shuffleblock (L-SB) receiving a layer output (Sl) of said last convolution layer (L-l) and the input image (ILR) and generating a shuffle-block output (114) that is a higher resolution than the input image (ILR) and said layer output (Sl),
        (b) an interpolation module (112) receiving the input image (ILR) and generating an interpolated image (116) that is higher resolution than the input image (ILR), and
        (c) a final convolution (L-FIN) receiving said shuffle-block output (114) and said interpolated image (116) and generating said output image (ISR),
    wherein
        (A) said layers include instructions for execution on said processing system,
        (B) the input image (ILR) is input to said input layer (L-IN) and to at least one of said convolution layers (L-n),
        (C) an initial output (110) of said input layer (L-IN) is input to at least one of said convolution layers (L-n), and
        (D) a layer output(S) of at least one of said convolution layers (L-n) is input to at least one subsequent convolution layer (L-n).

2. The system of claim 1 wherein the processors are configured to execute instructions programmed using a predefined set of machine codes and said layers include computational instructions implemented in the machine codes of the processor.

3. The system of claim 1 wherein said input image is a low-resolution image and said output image is a super-resolution image.

4. The system of claim 1 wherein each of at least one of said convolution layers (L-n), includes:
    (a) a respective convolution module (LCON-n) accepting data to respective said convolution layer (L-n),
    (b) a respective activation function (PReLU) processing output data from said respective convolution module (LCON-n), and
    (c) a respective bottleneck layer (LB) processing output data from said respective activation function (PReLU).

5. The system of claim 4 wherein the input image (ILR) and said initial output (110) are input to said bottleneck layer (LB), and said bottleneck layer (LB) generates said layer output(S).

6. The system of claim 1 wherein said layer output (Sl) is input to each subsequent convolution layer (L-n).

7. The system of claim 1 wherein said network (100) is trained with a training set based on high-resolution images and corresponding low-resolution images.

8. A method of training the network (100) of claim 1, the method comprising the steps of:
    (a) receiving one or more sets of high-resolution (IHR) images,
    (b) applying one or more transformations to at least a subset of said sets of high-resolution images to generate at least one associated set of low-resolution images (ILR),
    (c) creating a training set including said one or more sets of high-resolution images and said at least one associated set of low-resolution images, and
    (d) training (120) the network (100) using said training set.

9. A method for image processing, the method comprising the steps of:
 (i) configuring an artificial neural network (100) based on a training set of high-resolution images and corresponding low-resolution images, and
 (ii) inputting an input image (ILR) to an input layer (L-IN) and to at least one convolution layer (L-n),
 (iii) generating an initial output (110) from said input layer (L-IN) based on said input image (ILR) and sending said initial output (110) to at least a first convolutional layer (L-1) of said convolution layers (L-n), and
 (iv) generating a current layer output(S) of at least one of said convolution layers (L-n) based on said input image (ILR), said initial output (110) and any previous layer outputs(S), and sending said current layer output(S) to at least one subsequent convolution layer (L-n), and
 (v) generating an output image (ISR) by an output layer (L-OUT) based on a layer output (Sl) of a last convolutional layer (L-l) of said convolutional layers (L-n) and said input image (ILR), wherein said output layer (L-OUT) comprises:
 (a) a shuffleblock (L-SB) receiving the layer output (Sl) of said last convolution layer (L-l) and the input image (ILR) and generating a shuffle-block output (114) that is a higher resolution than the input image (ILR) and said layer output (Sl),
 (b) an interpolation module (112) receiving the input image (ILR) and generating an interpolated image (116) that is higher resolution than the input image (ILR), and
 (c) a final convolution (L-FIN) receiving said shuffle-block output (114) and said interpolated image (116) and generating said output image (ISR).

10. A computer usable non-transitory storage medium having a computer program embodied thereon for causing a suitably programmed system to process images, by performing the steps of claim 9 when such program is executed on the system.

* * * * *